United States Patent [19]

Carlsen

[11] 4,325,607
[45] Apr. 20, 1982

[54] APPARATUS FOR CONNECTING OPTICAL FIBERS

[75] Inventor: W. John Carlsen, Natick, Mass.

[73] Assignee: GTE Laboratories Incorporated, Waltham, Mass.

[21] Appl. No.: 23,862

[22] Filed: Mar. 26, 1979

[51] Int. Cl.³ .............................................. G02B 7/26
[52] U.S. Cl. .................................................. 350/96.21
[58] Field of Search .............. 350/96.20, 96.21, 96.22; 264/299, 300, DIG. 77; 339/94 R, 273 F

[56] References Cited

U.S. PATENT DOCUMENTS

| | | | |
|---|---|---|---|
| 3,181,105 | 4/1965 | Roach et al. | 339/94 R |
| 3,734,594 | 5/1973 | Trambarulo | 350/96.21 |
| 3,880,452 | 4/1975 | Fields | 350/96.21 X |
| 3,923,371 | 12/1975 | Dalgleish | 350/96.21 |
| 3,948,582 | 4/1976 | Martin | 350/96.21 |
| 4,043,026 | 8/1977 | Weidhaas et al. | 350/96.21 X |
| 4,076,376 | 2/1978 | Slaughter | 350/96.21 |
| 4,097,129 | 6/1978 | Wellington et al. | 350/96.21 X |
| 4,101,197 | 7/1978 | Kent et al. | 350/96.20 X |
| 4,123,138 | 10/1978 | Morrison | 350/96.21 |
| 4,148,554 | 4/1979 | Magnusson et al. | 350/96.21 |
| 4,178,067 | 12/1979 | Johnson et al. | 350/96.21 |

FOREIGN PATENT DOCUMENTS

| | | | |
|---|---|---|---|
| 2616071 | 10/1977 | Fed. Rep. of Germany | 350/96.21 |
| 2710099 | 9/1978 | Fed. Rep. of Germany | 350/96.21 |
| 1433755 | 4/1976 | United Kingdom | 350/96.21 |

OTHER PUBLICATIONS

Stallard et al, "Stuffing Of Optical Fibers", *IBM Tech. Discl. Bull.*, vol. 9, No. 11, Apr. 1967, p. 1581.

*Primary Examiner*—John D. Lee
*Attorney, Agent, or Firm*—Fred Fisher

[57] ABSTRACT

A one-piece molded elastomer splicer for permanent or temporary coupling of guided light between two optical fibers. Two cleaved fibers to be spliced are inserted into opposite ends of an elastic capillary tube somewhat smaller in diameter than the fibers, and pushed in until they meet in the center. Symmetrical elastic restoring forces automatically align the two fiber axes along the axis of the tube. When desired, the splicer can be transparent so that the resulting splice quality can be checked with a low-power microscope. Manual insertion of the fibers is possible with care, but a simple mechanical insertion jig is suggested. An optical fiber connector with built-in fiber-to-connector splice means connects two optical fibers with very low insertion losses even after many connect/disconnect cycles, with a simple and reliable means for installation in the field. The connector has a central mating interface, fabricated, aligned, polished, and anti-reflection coated at the factory, but with a built-in splicer for attaching to fibers in the field by the user.

18 Claims, 4 Drawing Figures

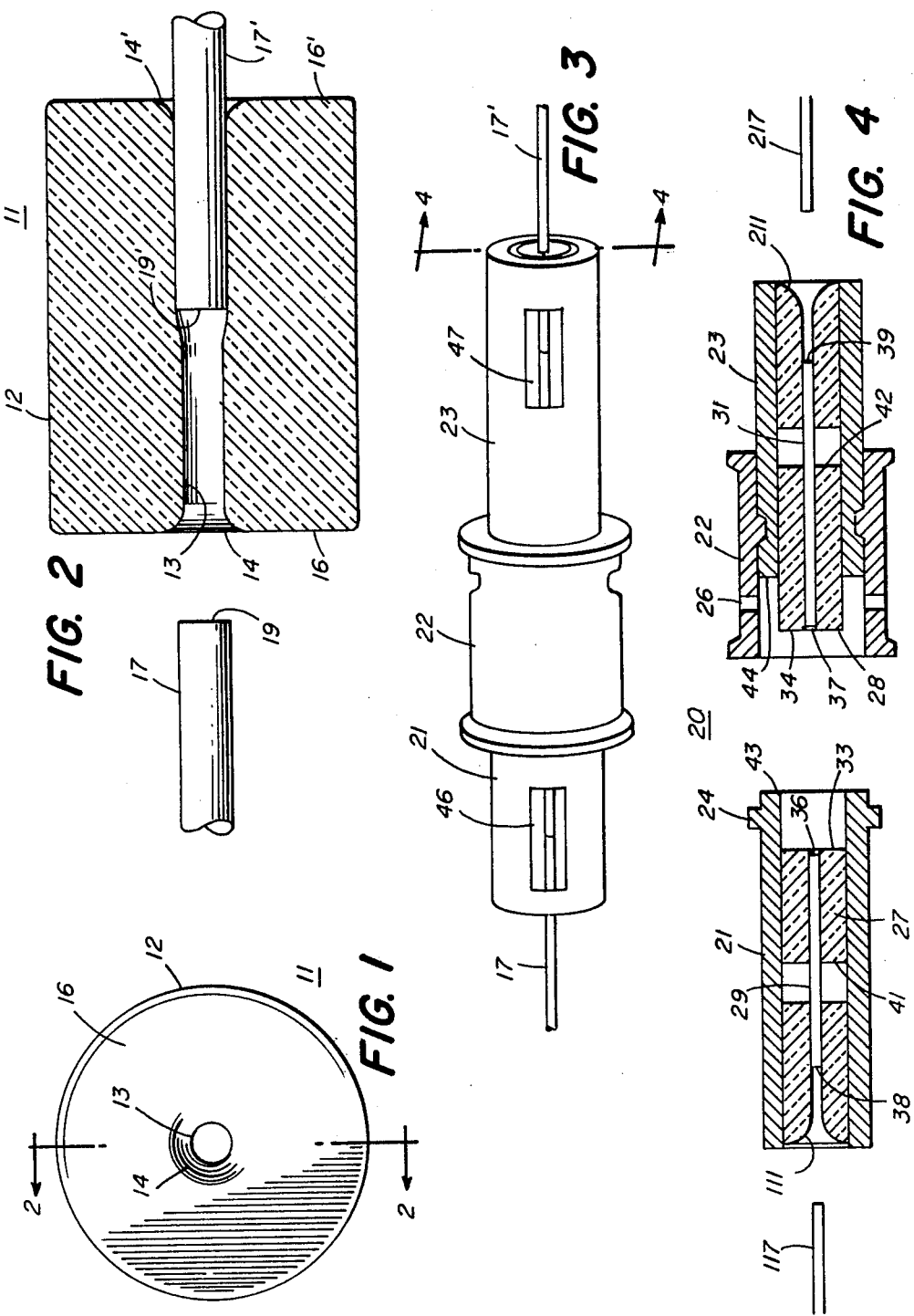

APPARATUS FOR CONNECTING OPTICAL FIBERS

BACKGROUND OF THE INVENTION

1. Field of the Invention

This invention relates to methods of and apparatus for connecting optical fibers. In particular, it relates to elastic one-piece splicers for optical fibers, optical fiber connectors utilizing fiber-to-connector splice means, and to related methods. Accordingly, it is a general object of this invention to provide new and improved methods and apparatus of such character.

2. Description of the Prior Art (a) Dual eccentric plugs have been used for connecting optical fibers. The fibers are epoxied into two cylindrical plugs, slightly off axis, and polished flat. The plugs are mounted with their axes parallel, but not co-linear. The plugs are rotated, with respect to each other, until the axes are co-linear, when maximum light throughput is achieved. Disadvantageously, such plugs required elaborate attachment of fiber and end preparation. Also, access was required to other ends of the fibers so that optical transmission could be monitored and optimized.

(b) Micromanipulator-assisted epoxy or fused splice. The fibers are manipulated in air, preferably with five degrees of freedom, for optimal alignment. Then, a drop of epoxy is applied to the fibers and cured. Alternatively, an arc melts and fuses the fibers. The manipulators can then be removed. Disadvantageously, micromanipulators are expensive. Also, to optimize alignment, either optical transmission should be monitored as above, or the ends should be watched with a microscope from two different angles.

(c) Alignment V-groove. Two fibers are brought together while being forced to the bottom of a groove, then either clamped or epoxied in place.

Disadvantageously, precision parts and insertion techniques are required. It was common to end with fiber ends separated too far or overlapping.

(d) Snug-fitting metal or glass capillary tube. Superficially similar to present invention, but requiring precision tolerances for alignment in a rigid tube rather than symmetric elastic forces. Disadvantageously, rigid capillary tube splicers require precision tolerance fits to a particular fiber size. When a fiber is too large, it does not fit in; when a fiber is too small, it does not hold on axis. Unfortunately, tolerances for axial alignment are generally somewhat tighter than manufacturing tolerances on fiber diameters; a tube that fits snugly on one fiber does not necessarily fit well enough on the other fiber to be spliced.

(e) Most commerical optical fiber connectors have the following basic principle of their connector design philosphy in common: the ends of the fibers to be connected are themselves brought together and separated with each connect/disconnect cycle, with the connectors serving only to align them precisely each time and hold them together securely. Various types of interface configurations have been used when the ends were brought together; intimate glass-to-glass contact, precise tolerance air gap (less than one mil apart), index-matching fluids, lenses, and buffer membranes, for example.

(f) Many successful connectors of the prior art, in terms of low insertion loss and simplicity of use, have been those that are installed onto the ends of a fiber at a factory, and cannot be installed by a user in the field. An example of this is a connector available from one manufacturer, in which a fiber end is epoxied into a machined plug, the fiber and plug are polished flat to a high optical quality, and the plug is then installed into a connector body with precise alignment of the fiber axis along the axis of the connector—all at the factory. The user makes the connection by screwing each connector end into a central axis-aligning section until the plugs meet. The precise factory machining and alignment account for the connector's low insertion loss and quick connecting means, but also results in extreme inflexibility when installing, changing, testing, or repairing an optical fiber system. Disadvantageously, such factory-installed connectors have been only obtainable attached to specific lengths of fiber, which cannot be altered or repaired in the field.

(g) A second manufacturer offers a commercially available, relatively easily field-installable connector. A fiber is cleaved and clamped into a connector end. This is then inserted into a central section where the fiber end is guided into a precisely molded dimple in a plastic disc. The dimple is filled with an optical gel which forms a gel lens whose two optical surfaces are the flat fiber end and the molded plastic surface. The two fibers, one on each side of the plastic disc, form two gel lenses which serve to image the light from one fiber into the other. Disadvantageously, such connectors have short sections of easily damaged bare fibers exposed when disconnected. The optical gel can trap dust particles and air bubbles, especially after a number of connect/disconnect cycles, which can cause significant light losses. Slight fiber cleaving irregularities alter the shape, and thus the performance, of the gel lens.

(h) A third manufacturer offers a precision connector, similar to that discussed at (f) above, that can be installed in the field. Disadvantageously, the use of such connectors requires that field technicians learn the fine art of optical polishing, and perform it in a field environment, rather than a controlled optics shop with proper facilities. The reliability of such connections is questionable.

SUMMARY OF THE INVENTION

Another object of this invention is to provide a new and improved transparent, easily manufactured splicer.

Still another object of this invention is to provide a new and improved rapid method of splicing.

Yet another object of this invention is to provide a new and improved connector for connecting two optical fibers with very low insertion loss even after many connect/disconnect cycles, with a simple and reliable means for installing the connectors to the fibers in the field.

In accordance with one aspect of one embodiment of the invention, a method for forming a temporary splice of two optical fibers includes inserting the fibers into opposite ends of an axial hole through a molded cylindrical piece of elastic material, the fibers being inserted until they meet approximately at the center of the piece. In one feature of the invention, index-matching fluid can be initially applied to the fibers. In accordance with another aspect of the invention, a method of forming a permanent splice of two optical fibers includes applying adhesive, uncured epoxy, or elastomer resin to the ends of the optical fibers, the applied substance having an appropriate matching refractive index when hardened.

The fibers are inserted into opposite ends of an axial hole through a molded cylindrical piece of elastic material until they meet approximately at the center thereof. Though not a preferred mode of the invention, the molded cylindrical piece of elastic material with its axial hole can be formed by initially mixing uncured elastomer resin with its curing agent. The resultant mixture is poured into a cylindrical mold. A glass or metal fiber, of the desired hole diameter, is suspended in the center of the mold. The mold and fiber are then placed into an oven until curing occurs. Then, the fiber is removed from the cured elastomer, and the elastomer is released from the mold. In accordance with one feature of the invention, alignment is performed with the aid of magnifying means.

In accordance with another embodiment of the invention, a combination includes two optical fibers and a molded cylindrical piece of elastic material having an axial hole therethrough. The two fibers are inserted into the axial hole at opposite ends thereof. Prior to insertion, the diameter of the axial hole is smaller than the diameter of either of the fibers. In accordance with certain features of the invention, the two fibers can have the same or different diameters. The molded piece can have its holes tapered to a larger diameter near the ends. The elastic material can include a urethane casting elastomer, and can be transparent.

In accordance with still another embodiment of this invention, an optical connector includes, in combination, a pair of connector bodies, each having an axial passageway therethrough and engaging means adapted to engage with each other. A first cylindrical plug is mounted within the axial passageway of the first connector body, the first plug having opposed first and second faces and having an axial orifice therethrough. A second cylindrical plug is mounted within the axial passageway of the second connector body, the second plug having opposed first and second faces and having an axial orifice therethrough. A first short section of optical fiber has a substantial portion thereof mounted within the first plug orifice; an axial position of the fiber extends from the second face of the first plug. In similar fashion, a second short section of optical fiber has a substantial portion thereof mounted within the second plug orifice; an axial portion of the fiber extends from the second face of the second plug. Individual splicing apparatus are mounted within the respective connector bodies for engaging with the axially extending portions of the short sections of optical fiber and optical fiber means to be connected. In accordance with certain features of the invention, at least one of the splicing apparatus includes a molded cylindrical piece of elastic material having an axial hole from one end to another. The material can be transparent and can include a urethane casting elastomer. The axial hole of the piece, prior to assembly, has a diameter dimensioned less than both the diameter of the short section of optical fiber and the diameter of the optical fiber means to be connected. A portion of each of the connector holes can be so formed, either transparent or cut-out, to permit visual inspection of fibers within the transparent material. Index matching material can be used to join a short section of optical fiber to optical fiber means to be connected. The first faces of the plugs can be ground and polished to high optical quality. An end of a section of optical fiber can be recessed from the first face of its associated plug such end being ground and polished to high optical quality.

BRIEF DESCRIPTION OF THE DRAWINGS

Other objects, advantages, and features of this invention will become more apparent from the following description when read in conjunction with the accompanying drawings, in which:

FIG. 1 is an end view of an elastic splicer in accordance with one embodiment of the invention;

FIG. 2 is a view, partly in section, taken along the line 2—2 of FIG. 1, showing the elastic splicer and a pair of optical fibers about to be joined;

FIG. 3 is non-exploded perspective view of an optical connector, and a pair of optical fibers joined thereto, in accordance with another embodiment of this invention; and FIG. 4 is an exploded view, partly in section, along the line 4—4 of FIG. 3.

DESCRIPTION OF THE PREFERRED EMBODIMENTS

An elastic splicer 11, in accordance with a preferred embodiment of the invention, consists of a molded cylindrical piece 12 of elastic material with a small axial cylindrical hole 13 therethrough, as shown in FIGS. 1 and 2. The splicer 11 is an elastic capillary tube which has a slightly smaller inside diameter than the outside diameter of the smallest diameter fibers to be used. The splicer 11 is flexible enough to stretch to accommodate the largest fibers to be used. Preferably, the hole 13 is tapered (at 14, 14') to a larger diameter near the ends 16, 16' to facilitate insertion of optical fibers 17, 17'.

Since both fibers 17, 17' to be spliced are larger in diameter than the tubular hole 13, when they are inserted in opposite ends 16, 16' of the splicer 11, they each stretch the tube wall. The stretched walls in turn exert elastic restoring forces on the fibers 17, 17'. Because of the cylindrical shape of both the fibers 17, 17' and the capillary tube 11, each fiber 17, 17' automatically centers along the original axis 18 of the tube by symmetrical radial restoring forces.

The two fibers 17, 17' with different diameters each individually align along the common tube axis 18, i.e., their axes align with one another, as required for maximum optical coupling efficiency.

The splicer 11 can be constructed of various elastomer materials, such as Conap TU-904 urethane casting elastomer. Such materials are transparent so that the resulting alignment can be evaluated by focussing on the fibers 17, 17' through the elastomer with a microscope. In actual tests, the fiber 17, 17' axes were observed to be aligned to well within 2 micrometers, near the resolution limit of the microscope.

The manufacture of small quantities of such a splicer 11 can be performed, as an example, by the following method: Uncured elastomer resin is mixed with its curing agent, and the mixture is poured into a small cylindrical mold. A piece of glass fiber or metal wire of the desired tube diameter is suspended in the center of the mold, which is placed in an oven until cured. Then, the fiber or wire is pulled out of the cured elastomer, leaving a high-quality, smooth-walled capillary tube of the same size, and the elastomer is released from the mold. The splicer is then ready for use. For high-speed mass-production, techniques such as injection molding are preferred.

In use, two bare glass fibers 17, 17' to be spliced are simply inserted into the splicer tube 11 and pushed in until they meet approximately in the center. For a temporary splice, that is all that is needed, since the forces of elasticity, adhesion, and friction prevent the fibers 17, 17' from moving apart or falling out on their own; a firm pull on the fibers 17, 17' is generally required to pull them apart.

To minimize optical throughput losses due to reflections from the fiber ends 19, 19' the fibers 17, 17' can be dipped into an index-matching fluid prior to insertion. The index-matching fluid tends to lubricate the fibers 17, 17' thus facilitating insertion.

By dipping the fiber ends 19, 19' into an adhesive or uncured epoxy or elastomer resin having the appropriate matching refractive index when hardened, the splice becomes permanent.

Inserting a 5 mil glass fiber into a 4 mil hole is not ordinarily a simplified task. However, when the hole 13 diameter is tapered, as at 14, to a considerably larger diameter at the ends 16, 16', and when a lubricating fluid is used, the process is considerably facilitated. Preferably, it is desirable to monitor the process under a low-power magnifier or microscope, especially when the fibers 17, 17' are being brought into final contact (assuming, of course, that the splicer 11 is transparent). This also allows a final check of the fibers 17, 17' alignment, end separation, and freedom from light-blocking particles and bubbles between the fibers 17, 17', before the bond becomes permanent and installed in the system.

In lieu of installing the fibers 17, 17' into the splicer 11 by hand, a simple jig could be used to hold the splicer 11 and the fibers 17, 17' firmly while slowly pushing in the fibers 17, 17' via a screw or micrometer means.

The elastic connector 11, described hereinabove, provides numerous advantages: It is one-piece, easily manufactured, and can be made transparent, facilitating inspection. The entire splicing operation takes about one minute (plus curing time if required). Automatic fiber axis alignment eliminates need for micromanipulators, throughput monitoring, or assembling of precision parts. Symmetric elastic forces readily accommodate mismatched fiber diameters over a relatively wide range. Further, resiliant elastomer material protects the spliced fiber interface from rough handling and from exposure to the environment.

The foregoing splicer 11 has numerous desirable features including the use of cylindrically symmetrical elastic restoring forces to automatically align two optical fibers along the same axis, and the use of a soft elastomer tube to accommodate different fiber diameters in a splice.

No external parts, such as clamps, are required to hold the fibers in place for a temporary splice, or while permanent bonding material is setting.

Different variations can be performed with the splicer, without departing from the spirit and scope of this invention. For example, more than one hole can be molded in a single-piece splicer for splicing several fibers in a very compact volume. Index-matching fluid can be injected into the capillary tube (either at the factory or in the field) before inserting the fibers 17, 17'.

In addition to being used to splice two fibers 17, 17' at their ends, the splicer 11 can be incorporated in a number of different devices, such as bulkhead splicers, optical feedthroughs, LED or detector terminations, etc. The splicer 11 can be incorporated in an optical fiber connector, as described more fully below.

An optical fiber connector using a simple, built-in fiber-to-connector splice means will now be described.

This connector is suitable for connecting two optical fibers with very low insertion loss even after many connect/disconnect cycles, with a simple and reliable means for installing the connectors to the fibers in the field.

Optical glass fibers are fragile: they break when bent beyond a critical curvature. They shatter when struck by hard objects, or when pressed against microscopic particles of dirt. Chips and microcracks are easily introduced, and often get worse in time, especially with repeated handling and flexing.

Efficient coupling of light (visible, IR, etc.) energy from one fiber to another with prior art devices tends to be difficult. Optical discontinuities in a waveguide tend to convert guided modes to radiation modes, which result in energy escaping from the confines of the waveguide walls. For fiber connectors and splices, one approach is to butt the two fiber ends together in such a way as to optimally approximate a single, continuous waveguide. The parameters of principal concern for minimizing interface discontinuity losses are:

(a) lateral misalignment of fiber axes,
(b) angular misalignment of fiber axes,
(c) longitudinal separation of fiber ends,
(d) reflections from fiber ends,
(e) optical wavefront distortions due to curved or angled end surfaces, and
(f) optical scattering from chips, cracks, etc.

In light of the above considerations, an optical fiber connector in accordance with the invention is mechanically rugged, field-qualified, well-protected, and precision constructed.

An optical fiber connector 20, in accordance with a preferred embodiment of the invention, is depicted in a perspective view in FIG. 3 and in sectional view in FIG. 4.

Connector bodies 21 and 22-23 are shown as two hollow tubes with standard (BNC-type) bayonet/pin connection means 24,26.

Precision fiber-holding plugs 27, 28 are fabricated and installed in the connector bodies 21 and 22-23 at the factory. The plugs 27, 28 permanently hold short sections of optical fiber 29, 31 precisely along the connector axis 32. Prior to installing the plugs 27, 28 in the bodies 21 and 22-23, the mating plug ends 33, 34 are ground and polished to high optical quality, including the fibers 29, 31. The polished fiber 29, 31 ends 36, 37 are recessed from the respective plug surface 33, 34 by a few micrometers, thus maintaining a precise spacing between the fiber ends 36, 37 when the plugs 27, 28 are brought together. The other end 38, 39 of the fiber 29, 31 in each plug 27, 28 is cleaved a short distance (e.g., about 1 cm) from the unpolished end 41, 42 of the respective plug 27, 28.

For optimum optical transmission through the main connector interface, the fibers 29, 31 are given an anti-reflection coating on the polished end 36, 37. Standard vacuum coating techniques can be used, and a large number of fiber/plugs can be placed in a coating machine for production. Because the fiber surface 36 is nearly flush with the surrounding plug surface 33, the coating is free of "edge effects" which would prevent coating a free-standing fiber.

It is noted that such commercially available optical connectors which are attached at a factory with a long length (i.e., up to several km) of optical fiber cable could not be economically anti-reflection coated because (a) the cabling materials must all be vacuum-compatible and (b) only a few connectors could be coated at a time because of the space requirements for placing attached spools of cable in a vacuum chamber along with the connector ends.

The fiber 29/plug 27 and the fiber 31/plug 28 are installed and centered in the connector bodies 21 and 22-23, respectively, as shown in FIG. 4, such that when they are brought together to be connected, the fiber axes 32 are aligned by the close fit of the plug 28 within the inner diameter of the connector body 21. The plug faces 33, 34 contact and are held together by the bayonet spring force; the connector body 21, 23 faces 43, 44 do not contact, and thus need not be precision machined.

Optical fiber splicing devices 111, 211 are also installed inside the connector bodies 21, 23 at the factory, such that the fiber sections 29, 31 extending from the plugs 27, 28 are inserted into the splicers 111, 211, respectively, and are ready for splicing in the field to external fibers 117, 217. Shown in FIG. 4, for example, are capillary tube splicing means 111, 211 similar to the elastic capillary splicer 11 described hereinabove, see FIGS. 1 and 2. Although this is the preferred splicing mode contemplated, any compact, easy-to-use splicing apparatus that yields repeatably high transmission efficiency can be used along with the appropriate connector housing modification required to accommodate it.

Attaching the external fibers 117, 217 to the connector 20 via the splicing devices 111, 211, is analogous to attaching external cable wires to an electrical connector by soldering or crimping. Freed from the restrictions of quick connect/disconnect capability, the optical splice can utilize an index matching material (e.g., an epoxy) at the interface to essentially eliminate losses due to end reflections and fiber end imperfections due to field cleaving methods (polishing not required). The connector 20 is completely fabricated at a factory except for the final splicing of the external fibers 117, 217. The installation technique is therefore entirely dependent on the splicing method chosen, and can require that one or more additional parts be attached by the user. In the preferred embodiment of an elastic splicing capillary tube 11 built into the connector 20, the installation is particularly simple. After cleaving the fibers 117, 217 and injecting some index-matching material into the capillary, the fibers 117, 217 are simply inserted into the respective capillary and pushed in until they contact the built-in corresponding fiber section 29, 31. With a cut-out 46, 47 provided in the connector body 21, 23, respectively, opposite the splice interface (FIG. 3), the resulting splice can be inspected visually through the transparent capillary tube with the aid of a magnifier or low-power microscope before the bond sets permanently.

With non-setting index matching fluid used in the splicer 111, 211, temporary splices result and the connector 20 can be disassembled by pulling the fibers 117, 217 out of the splicers 111, 211. The inward radial restoring forces of the stretched elastic capillary tubes 111, 211 holds the fibers 117, 217 in against moderate tugs on the fibers; for more strength, additional strain-relief clamping means on the connector 20 can be provided.

After installation, the connector 20 is used just like any analogous electrical connector (like a BNC connector, for the version described above and in FIGS. 3 and 4). Simply bring the male and female connector halves together, push firmly, and turn the bayonet lock. Disconnecting them is the reverse procedure.

The connector 20, described hereinabove in accordance with the invention, has numerous desirable features:

(i) Simple, rugged construction, few moving parts.
(ii) Simple, reliable, field installation method.
(iii) Fiber completely protected from environment and abuse; only the end surfaces are exposed when the connector bodies are disconnected.
(iv) Bare fibers are not to be handled, flexed, or clamped over and over with each connect/disconnect cycle.
(v) Fiber ends are ground and polished optically flat and perpendicular to the fiber axis.
(vi) The fiber ends are anti-reflection coated.
(vii) Connecting and disconnecting is as easy and reliable as electrical connectors.
(viii) Very low insertion loss.

Various modifications will suggest themselves to those ordinarily skilled in the art without departing from the spirit and scope of this invention. For example, a multi-fiber optical cable connector could be made in essentially the same manner as the single-fiber version described above. Several fiber sections could be installed in the plug at the factory with similar precise alignment techniques, and ground, polished, and coated as before. Likewise, a multi-fiber splicing means can be built into the connector with each of the plug fiber ends inserted into the splicing means ready for splicing to external cable fibers. Further, a single-piece elastomer splicer can be molded with an array of several capillary tubes in the same manner that a single tube is molded.

As another example, instead of the plug faces 33, 34 contacting when the connector bodies 21 and 22-23 are brought together, the connector body faces 43, 44, suitably machined, can be the contacting parts. The plugs 27, 28 should in that case be positioned in the connector bodies 21, 22-23 such that when the faces 43, 44 are in contact (and held together by the bayonet spring) the plug faces 33, 34 would be held apart by a precise air gap. It would then not be necessary for the fibers 29, 31 to be recessed from the plug surfaces 33, 34 to protect them from butting contact with each other; the surfaces would be polished uniformly flat.

In still another example, although a simple bayonet securing means was described for the connector 20, a wide variety of alternative securing means could be used instead. For example, the body 22 could include a rotating threaded sleeve which screws onto mating threads on the body 21; tightening the sleeve when the connector mating surfaces contact would replace the spring-loaded bayonet. As another example, two identical connectors similar to the one on the right in FIG. 4 could be designed to be inserted into a central union section. Numerous other suitable securing means are well known in the electrical connector art, and can be readily adapted to the fiber connector.

Thus, it is desired that this invention be construed broadly, and that is be limited solely by the scope of the allowed claims.

I claim:
1. In combination,
a first optical fiber having a first outer diameter;
a second optical fiber having a second outer diameter; and a molded cylindrical piece of elastic material having an axial hole of a third diameter from one end of said piece to another end thereof;

said first fiber being inserted part-way through said axial hole of said piece from said one end thereof;

said second fiber being inserted part-way through said axial hole of said piece from said another end thereof;

wherein, prior to insertion of said fibers, said third diameter is smaller than said first diameter and said second diameter.

2. The combination as recited in claim 1 wherein said first diameter and said second diameter are of different dimensions.

3. The combination as recited in claim 1 wherein said first diameter is smaller than said second diameter.

4. The combination as recited in claim 1 wherein said material is transparent.

5. The combination as recited in claim 1 wherein said material includes a urethane casting elastomer.

6. In combination, a first optical fiber having a first outer diameter;

a second optical fiber having a second outer diameter; and a molded cylindrical piece of elastic material having an axial hole from one end of said piece to another end thereof;

said axial hole having a third diameter from a first plane perpendicular to the axis of said hole, near said one end, to a second plane perpendicular to said axis of said hole, near said another end;

said molded piece having said hole tapered to a larger diameter near said ends;

said first fiber being inserted part-way through said axial hole of said piece from said one end thereof;

said second fiber being inserted part-way through said axial hole of said piece from said another end thereof;

wherein, prior to insertion of said fibers, said third diameter is smaller than said first diameter and said second diameter.

7. In combination, an optical connector comprising a first connector body having an axial passageway therethrough and a first engaging means;

a second connector body having an axial passageway therethrough and a second engaging means, said engaging means of said bodies being adapted to engage each other;

a first cylindrical plug mounted within said axial passageway of said first body, said plug having opposed first and second faces and having an axial orifice therebetween;

a second cylindrical plug mounted within said axial passageway of said second body, said second plug having opposed first and second faces and having an axial orifice therebetween;

a first short section of optical fiber having a substantial portion thereof mounted within said first plug orifice and having an axial portion extending from said second face of said first plug;

a second short section of optical fiber having a substantial portion thereof mounted within said second plug orifice and having an axial portion extending away from said second face of said second plug;

a first splicing apparatus mounted within said first body for engagement with said axially extending portion of said first short section of optical fiber and a first optical fiber means to be connected; and a second splicing apparatus mounted within said second body for engagement with said axially extending portion of said second short section of optical fiber and a second optical fiber means to be connected.

8. The combination as recited in claim 7 wherein at least one of said splicing apparatus includes a molded cylindrical piece of elastic material having an axial hole from one end of said piece to another.

9. The combination as recited in claim 8 wherein said material includes a urethane casting elastomer.

10. The combination as recited in claim 8 wherein said material is transparent.

11. The combination as recited in claim 10 wherein a portion of each of said bodies is so formed to permit visual inspection of fibers within said transparent material.

12. The combination as recited in claim 11 wherein said portions include transparent means to permit visual inspection.

13. The combination as recited in claim 11 wherein said portions include cut-out means to permit visual inspection.

14. The combination as recited in claim 8 wherein said axial hole of said cylindrical piece, prior to assembly, has a diameter dimensioned less than either a diameter of one of said short sections of fiber and a diameter of one of said optical fiber means to be connected.

15. The combination as recited in claim 8 further comprising index-matching material for joining one of said short sections to optical fiber means to be connected.

16. The combination as recited in claim 7 wherein said first faces are ground and polished to high optical quality.

17. The combination as recited in claim 7 wherein an end of said first section of optical fiber is recessed from said first face of said first connector body, and wherein an end of said second section of optical fiber is recessed from said first face of said second connector body.

18. The combination as recited in claim 17 wherein said recessed ends are ground and polished to high optical quality.

* * * * *